United States Patent [19]

LoCicero et al.

[11] Patent Number: 4,641,179

[45] Date of Patent: Feb. 3, 1987

[54] ECONOMICAL HIGH-DEFINITION TELEVISION USING A MODULATED-SIGNAL COMBINATION

[75] Inventors: Joseph L. LoCicero, Riverside; Melih Pazarci, Chicago; Theodore S. Rzeszewski, Lombard, all of Ill.

[73] Assignee: AT&T Bell Laboratories, Murray Hill, N.J.

[21] Appl. No.: 684,489

[22] Filed: Dec. 21, 1984

[51] Int. Cl.⁴ .............................................. H04N 11/12
[52] U.S. Cl. ........................................ 358/12; 358/15; 358/16
[58] Field of Search ............................. 358/12, 15, 16

[56] References Cited

U.S. PATENT DOCUMENTS

| | | | |
|---|---|---|---|
| 2,635,140 | 4/1953 | Dome | 358/15 |
| 4,200,881 | 4/1980 | Carnt et al. | 358/16 |
| 4,510,520 | 4/1985 | Parker et al. | 358/15 |
| 4,521,803 | 6/1985 | Gittinger | 358/12 |
| 4,564,857 | 1/1986 | LoCicero et al. | 358/12 |

OTHER PUBLICATIONS

*Proceedings of the IEEE*, "A Compatible High-Resolution TV System for Cablecasting", Edward W. Herold, vol. 58, No. 7, Jul., 1970, pp. 1013–1015.

*Primary Examiner*—John W. Shepperd
*Attorney, Agent, or Firm*—John C. Moran

[57] ABSTRACT

A television (TV) system having a compatible high-definition signal receivable at conventional resolution by conventional TV receivers without auxiliary apparatus with carrier modulated high-definition luminance information being transmitted in a continuous spectrum spanning two conventional TV channels, carrier modulated quadrature amplitude modulated (QAM) high-frequency chrominance information being transmitted in the luminance spectrum and carrier modulated QAM low-frequency chrominance information being transmitted outside luminance spectrum. A decoder recovers the high-definition luminance information by demodulating the transmitted signal. The chrominance information is recovered from the transmitted signal by first notch filtering the transmitted high-definition signal to remove energy existing between the two sidebands of the QAM high-frequency chrominance information, and then, demodulating at the carrier frequency. The demodulating at the carrier frequency results in the QAM high- and low-frequency chrominance information forming a continuous spectrum that is then bandpass filtered. The high-definition I and Q chrominance signals are then recovered from the bandpass filtered chrominance information by a QAM demodulator. The QAM demodulation of the latter results in continuous high-definition I and Q chrominance signals.

13 Claims, 6 Drawing Figures

ECONOMICAL HIGH-DEFINITION TELEVISION USING A MODULATED-SIGNAL COMBINATION

TECHNICAL FIELD

This invention relates to a system for improving television (TV) picture quality and particularly to encoding and decoding facilities for use in such a system to provide a high-definition picture to specially designed receivers and usual quality picture to conventional receivers without alterations.

BACKGROUND OF THE INVENTION

It has long been desired to provide a high-definition television picture that approaches the quality of a projected 35 millimeter photographic film image. See, for example, *Image Quality,* "A Comparison of Photographic and Television Systems," Otto H. Schade, Jr., RCA Corporation, 1975.

An approach to providing high-definition television that could be received as a conventional television picture by conventional television receivers operating according to the Natioal Television Standards Committee (NTSC) requirements or could be received as a high-definition television picture by newly designed receivers without requiring prohibitively large bandwidth is disclosed in an article entitled, "A Compatible High-Definition Television System", by T. S. Rzeszewski, *The Bell System Technical Journal,* Vol. 62, No. 7, September 1983, pp. 2091–2111. In that system, the high-frequency luminance and chrominance information and the conventional luminance and chrominance information are combined into a baseband signal before being modulated by a carrier for the transmission of the baseband signal on two television channels. This system is particularly applicable to high-power transmitters such as used by commercial television stations since the signal to be transmitted is first formed at the baseband level and then modulated and amplified for transmission. Whereas the system proposed by Rzeszewski appears to be applicable for broadcast television, it does have the disadvantage of requiring expensive encoders at the transmitter and expensive decoders in each individual TV receiver.

The article by E. W. Herold, entitled, "A Compatible High-Resolution TV System for Cablecasting", *Proceedings of the IEEE,* Vol. 58, No. 7, July, 1970, pp. 1013–1015, suggests that the luminance portion of the TV display can be improved for low-power applications by using an adjacent channel to communicate additional luminance information. However, the latter article does not disclose a method for including the additional luminance information; nor does it indicate a method for improving the chrominance information, for reducing cross-effects between the chrominance and luminance information, or for separating the chrominance and luminance information when modulated and amplified to transmission and power levels.

Therefore, there exists a need for an economical high-definition television system that provides both improved luminance and chrominance information, that reduces cross-effects, and is compatible with NTSC type TV receivers. Such a system would find widespread use in low-power applications such as home cable delivery systems or intercampus video networks such as those proposed for large university campuses or corporation headquarters.

SUMMARY OF THE INVENTION

The foregoing problems are solved and a technical advance is achieved in accordance with the principles of this invention incorporated in a structural embodiment in which high-definition television picture signals are provided that can be received on conventional television sets and that can be received on modified receivers with improved picture quality. Advantageously, high-definition chrominance components are each separately comb filtered to help reduce cross-effects and then modulated and amplified to broadcast power and carrier frequency and, then, combined with a similar modulated and amplified high-definition luminance signal for providing a broadcast signal. The broadcast signal is decoded by a decoder that is responsive to the latter to demodulate this signal to obtain the luminance signal and chrominance information.

Advantageously, the chrominance components are each band-split into high- and low-frequency segments before modulation. Then, the low-frequency segments are quadrature amplitude modulated (QAM) before being modulated at the carrier frequency, and the high-frequency segments are also QAM modulated before being modulated at the carrier frequency. The decoder recovers the chrominance components by notch filtering the carrier modulated high-definition television signal to eliminate spectrum energy between the two sidebands of QAM high-frequency segment and, then, demodulates and bandpass filters the QAM segments. A single QAM demodulator is then used to recover both high-definition chrominance components from the demodulated and bandpass filtered QAM segments for display along with the high-definition luminance information.

Advantageously, in another illustrative embodiment of the invention, the high-frequency segment of one chrominance component is first single sideband modulated and summed with the luminance information, and the result is carrier frequency modulated. The other chrominance component and the low-frequency segment of the one chrominance component are QAM modulated with the result being frequency translated to the carrier frequency. The summed and translated information is then combined for transmission.

Advantageously, a decoder is responsive to the transmitted signal to demodulate the luminance information and high-frequency segment of one chrominance component and to demodulate the other chrominance component and the low-frequency segment of the one chrominance component. The high- and low-frequency segments of the one chrominance component are then combined in the decoder before being displayed along with the luminance information and other chrominance component.

BRIEF DESCRIPTION OF THE DRAWING

In general, system elements, when first introduced in a figure, are each designated with a number that uses the figure number as the most significant digits of the element number.

DETAILED DESCRIPTION

Figure 1:
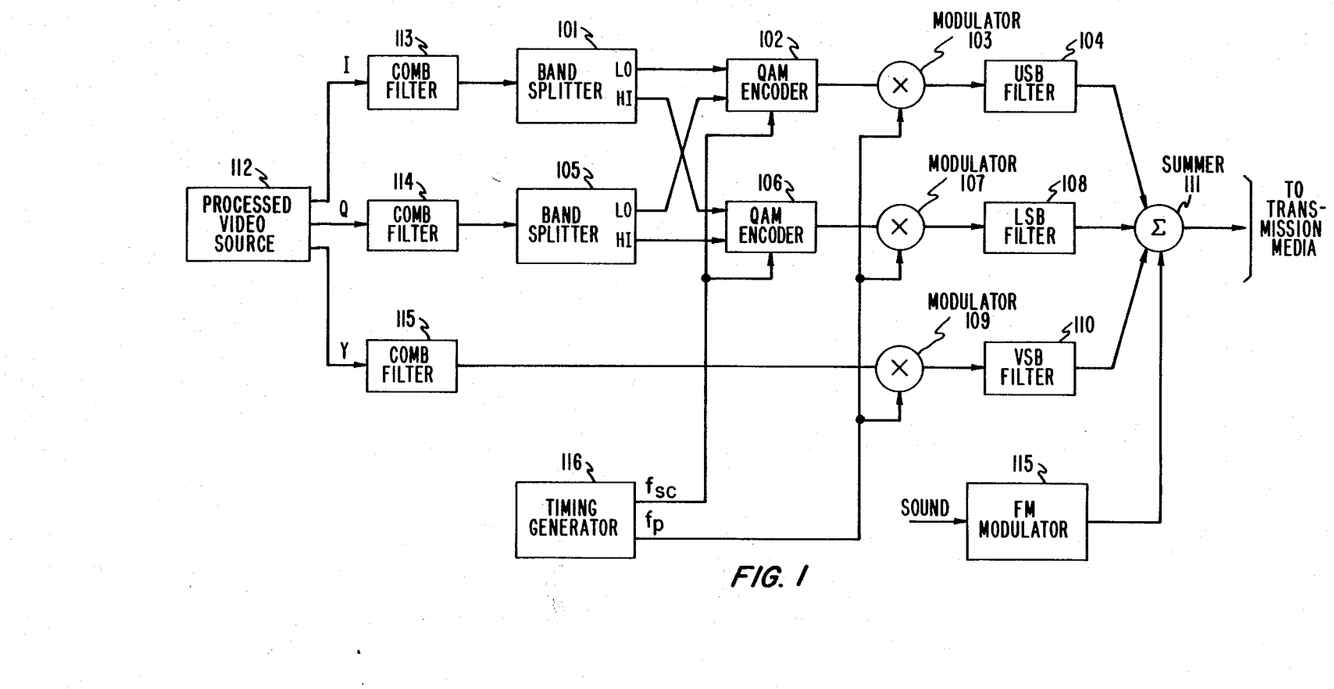
FIG. 1 is a block diagram of the high-definition encoder of one illustrative embodiment of our invention.

The following describes a television system that is compatible with conventional NTSC receivers and also capable of displaying high-resolution television pictures on this system's specially designed receivers. An encoding system for producing the high-definition television signal is illustrated in FIG. 1. Processed video source 112 produces Y, I, and Q signals that have a bandwidth of 7.25 megahertz (MHz). These Y, I, and Q signals have already been line decimated to 525 lines per frame with a scan rate of the NTSC standard 15.7 kilohertz (kHz). The encoder is responsive to the luminance signal, Y, from video source 112 to modulate and amplify this signal at the carrier frequency, $f_p$. The encoder is responsive to the two color components, I and Q, to comb filter these components to prevent cross-luminance effects and, then, to separate these two signals into high- and low-frequency I and Q signals. The low-frequency chrominance signals are then quadrature amplitude modulated (QAM) at the color subcarrier, $f_{sc}$, before being modulated and amplified at the carrier (or intermediate) frequency, $f_p$. The resulting modulated and amplified signal is then filtered to remove the lower sideband. The high-frequency chrominance signals are also quadrature amplitude modulated at the $f_{sc}$ frequency before being modulated and amplified at the $f_p$ frequency. The latter resulting signal is then filtered to remove the upper sideband. All of the modulated and amplified signals are then combined with the frequency modulated (FM) sound to produce the spectrum illustrated in FIG. 2. The luminance information is contained within the spectrum portion 201, the high-frequency chrominance information is contained within the spectrum portions 202 and 203 with the low-frequency chrominance information being contained within spectrum portion 204.

Figure 2:
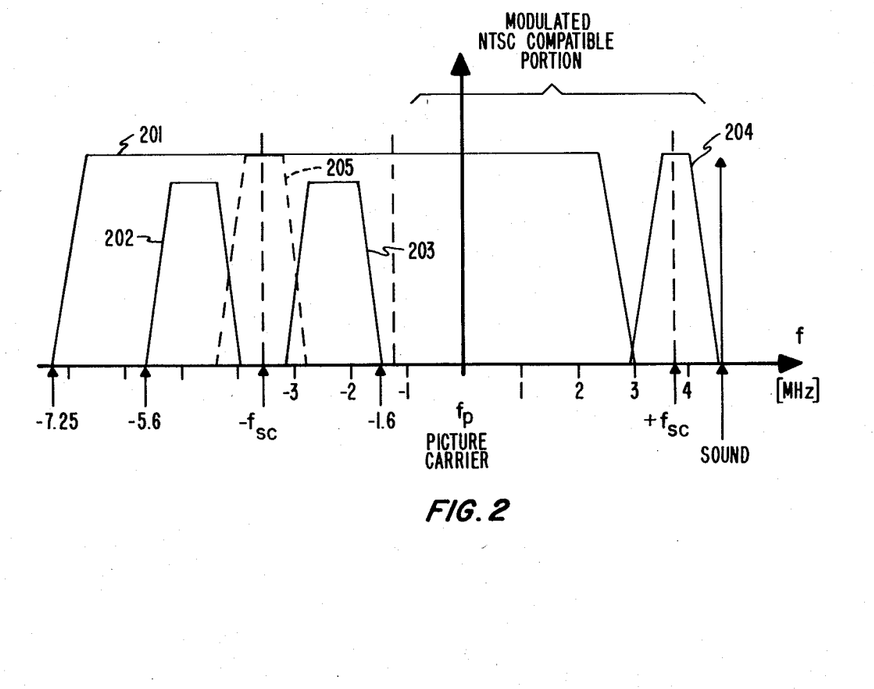
FIG. 2 illustrates the frequency spectrum of the output of the encoder illustrated in FIG. 1.

Consider now, the operation in the encoder illustrated in FIG. 1 in greater detail. The luminance signal from processed video source 112 is first comb filtered by filter 115 to remove any energy at or near odd multiples of half the horizontal line rate ($f_h$). After being comb filtered, the Y signal is power modulated by modulator 109. The output of modulator 109 is then filtered by vestigial sideband filter 110 to remove any undesired frequencies resulting from the modulation by element 109 that might interfere with other portions of the spectrum illustrated in FIG. 2 and a portion of the upper sideband above $F_p+3$ MHz. The output of filter 110 is represented in FIG. 2 by spectrum portion 201.

Consider now, how the encoder illustrated in FIG. 1 encodes the I and Q signals from processed video source 112. The I and Q signals are first comb filtered by filters 113 and 114, respectively, to prevent cross-effects when the signals are eventually interleaved in summer 111. The resulting signals from filters 113 and 114 are then separated into low- and high-frequency portions by band splitters 101 and 105. QAM encoder 102 is responsive to the low-frequency I and Q signals to quadrature modulate these signals at the $F_{sc}$ frequency in a manner similar to an NTSC color encoder but with the bandwidth being limited to 0.5 MHz. The output of element 102 is then modulated and amplified at the carrier frequency by modulator 103. The output of modulator 103 is then filtered to remove the lower sideband resulting in the spectrum portion 204 of FIG. 2. The high-frequency I and Q signals are similarly encoded by encoder 106, modulated and amplified by element 107, and the upper sideband removed by filter 108 resulting in spectrum portions 202 and 203. The outputs of filters 104, 108, and 110 and FM modulator 115 are then combined by summer 111 for transmission over the broadcast medium.

Figure 3:
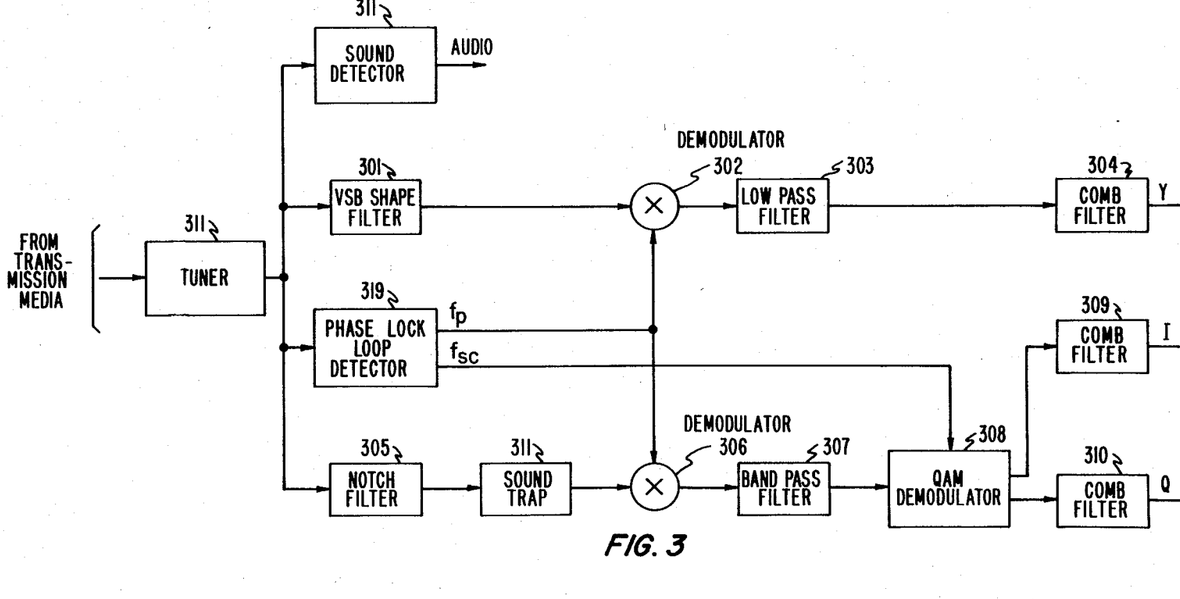
FIG. 3 is a block diagram of a high-definition decoder of one illustrative embodiment of our invention for decoding the signal illustrated in FIG. 1 for display purposes.

FIG. 3 illustrates a decoder for receiving the transmitted output of the encoder of FIG. 1 for display purposes. The luminance information is recovered from the transmitted signal by filter 301 performing a vestigial sideband shaping of the transmitted signal and removing the low-frequency chrominance before the signal is demodulated with a signal at the carrier frequency, $F_p$, by demodulator 302. Low-pass filter 303 then rejects all frequencies above 7.25, and filter 304 comb filters the output of filter 303 so as to remove any interfering high-frequency chrominance components. The resulting Y signal is then available for display purposes.

The total chrominance signal (I and Q) is recovered from the transmitted signal by notch filter 305 filtering out the frequencies illustratively between $f_p - f_{sc} \pm 0.5$ MHz which is the spectral region between spectrum portions 202 and 203. The output of filter 305 is then demodulated by demodulator 306. The output of demodulator 306 is then bandpass filtered by filter 307 to eliminate frequencies except those between 1.6 and 5.6 MHz. The output of filter 307 is then QAM demodulated by element 308 with a signal at the color subcarrier frequency, $f_{sc}$, to recover the chrominance signals. The resulting chrominance signals from demodulator 308 are then comb filtered over a frequency range of 0.5 to 2.0 MHz to remove any interference between the high-frequency chrominance signal and the luminance signal.

The resulting I and Q signals from comb filters 309 and 310, respectively, as well as the resulting Y signal from comb filter 304 are then available for display by a high-definition display monitor.

Figure 4:
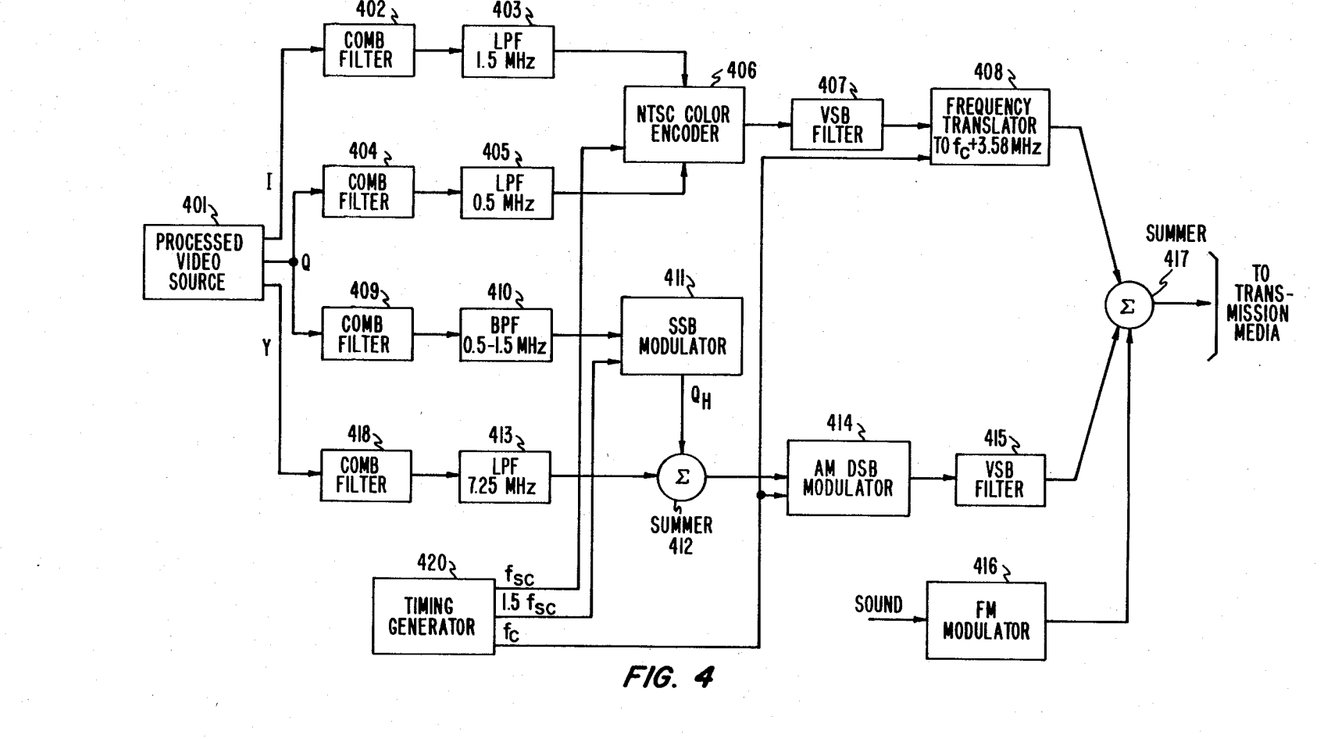
FIG. 4 illustrates in block diagram form, a high-definition encoder of a second illustrative embodiment of our invention.
Figure 5:
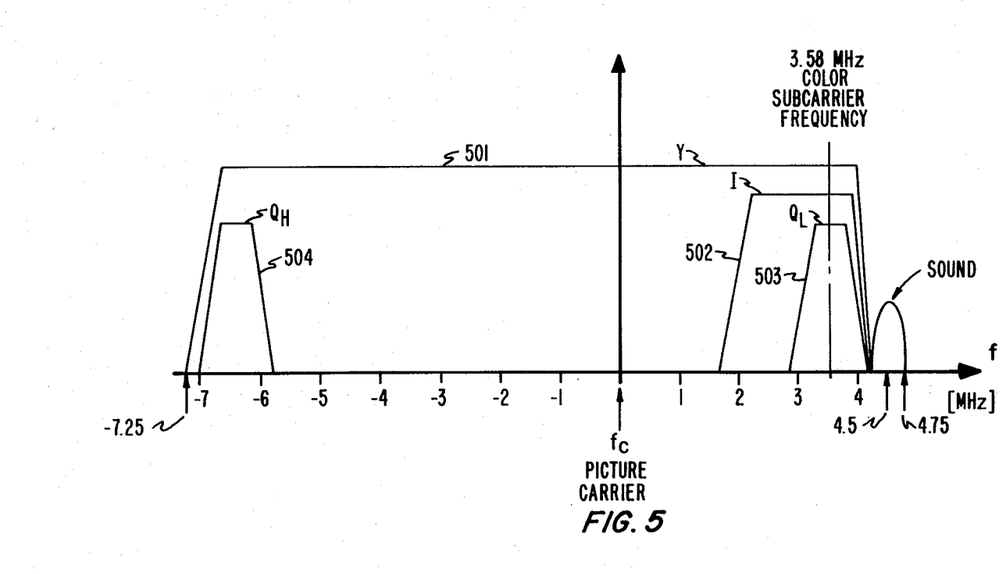
FIG. 5 illustrates the frequency spectrum of the transmitted signal from the encoder of FIG. 4.

Another illustrative embodiment of an encoder, in accordance with our invention, is illustrated in FIG. 4. The frequency spectrum generated by the encoder of FIG. 4 is illustrated in FIG. 5, and the output of the encoder of FIG. 4 is directly communicated on the broadcast media. The chrominance signals, I and $Q_L$, are encoded into spectrum portions 502 and 503 of FIG. 5 in the manner described below. The high-freuqency Q signal is encoded into spectrum portion 504. The frequency spectrum of I is matched to that of the high- and low-frequency Q signals, $Q_H$ and $Q_L$, respectively. First, the I and Q signals from processed video source 401 are comb filtered by filters 402 and 404, respectively, to prevent cross-effects and then low-pass filtered in the appropriate manner by filters 403 and 405 to properly band limit these signals. The outputs of filters 403 and 405 are then encoded by encoder 406 in the normal NTSC color coding manner. The output of encoder 406 is then filtered to eliminate the vestigial sidebands of the modulated I signal by filter 407. The output of filter 407 is then frequency translated and amplified so as to occupy spectrum portions 502 and 503 in FIG. 5.

The high-frequency chrominance portion of the Q signal, $Q_H$, which is indicated by spectrum portion 504 of FIG. 5, is formed in the following manner. The Q signal from processed video source 401 is first comb filtered by filter 409 to eliminate any vertical spectrum near odd multiples of half the line rate ($f_h$) then bandpass filtered by filter 410 to allow only the frequencies between 0.5 to 1.5 MHz to be used. The output of filter 410 is then single sideband modulated at a frequency which may advantageously be 1.5 times $f_{sc}$ by modulator 411. The output of modulator 411 is combined by summer 412 with the luminance information, Y, from processed video source 401 which has been low-pass filtered to limit the Y signal to a range of 0 to 7.25 MHz after having first been comb filtered by filter 418 to remove any energy in the vertical spectrum near odd multiples of $f_h/2$. The output of summer 412 is then double sideband modulated by modulator 414 and vestigial sideband filtered by filter 415 to remove components above $f_c+4.2$ MHz. Summer 417 then forms the signal to be transmitted on the transmission media by combining the outputs of the sound FM modulator 416, frequency translator 408 (consisting of a modulator with a carrier frequency $f_c$ and an upper sideband filter to remove the lower sideband) and filter 415 to produce the spectrum illustrated in FIG. 5.

Figure 6:
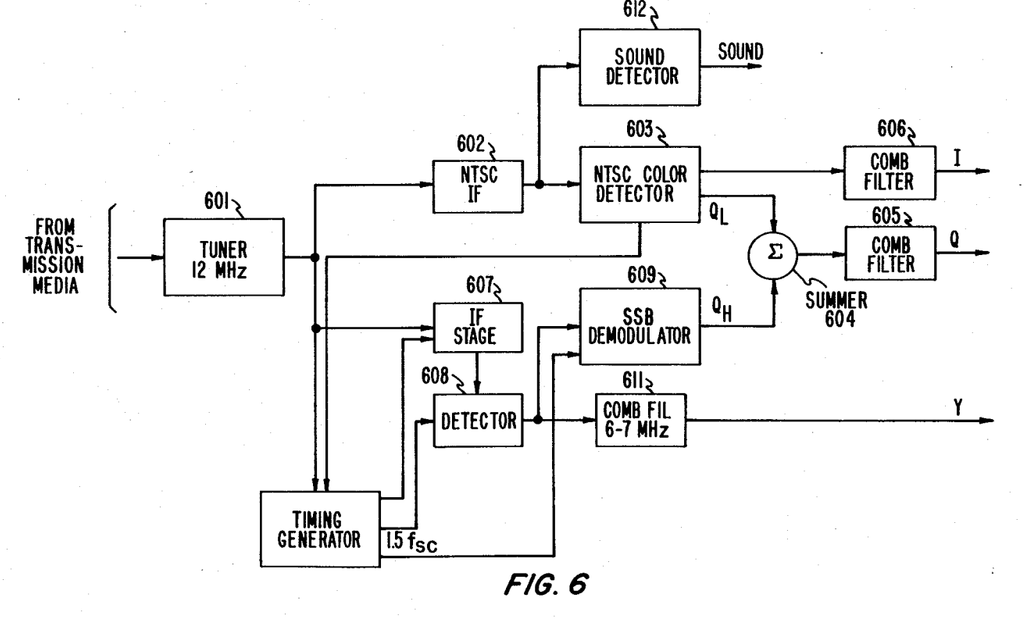
FIG. 6 illustrates a block diagram of a high-definition decoder for decoding the signal illustrated in FIG. 5 for display purposes.

A decoder illustrated in FIG. 6 is an illustrative embodiment of a decoder for decoding the signal illustrated in FIG. 5. Tuner 601 is responsive to the signal illustrated in FIG. 5 to communicate this signal to IF stages 602 and 607. IF stage 602 is similar to the standard NTSC IF stage. The sound is captured from the signal by sound detector 612 which is similar to a standard NTSC sound detector. The low-frequency chrominance signals that are contained in spectrum portions 502 and 503 of FIG. 5 are detected by detector 603 in a manner similar to the standard NTSC method. The I signal from detector 603 is then comb filtered by filter 606 to eliminate any interference from the luminance signal. The low-frequency signal, $Q_L$, from detector 603 is then combined with the high-frequency signal, $Q_H$, by summer 604 and then comb filtered by filter 605 to eliminate any interference from the luminance signal.

The luminance signal, Y, and the high-frequency signal, $Q_H$, are detected in the following manner. IF stage 607 is responsive to the output of tuner 601 to extract the information contained in the spectrum of FIG. 5 from approximately $-7.25$ MHz to 1.25 MHz with respect to the carrier frequency $f_c$. Detector 608 then frequency translates and limits this information so as to reproduce a portion of spectrum portion 501 and spectrum 504. Comb filter 611 then filters the output of detector 608 to eliminate the high-frequency chrominance signal, $Q_H$, from Y, which is in the region between 6 to 7 MHz.

The high-frequency chrominance component, $Q_H$, is demodulated by single sideband demodulator 609. The $Q_H$ signal is then combined with the $Q_L$ signal by summer 604 as previously described. The outputs of filters 606, 605, and 611 are then displayed on a high-definition monitor display.

It is to be understood that the above-described embodiment is merely illustrative of the principles of the invention and that other arrangements may be devised by those skilled in the art without departing from the spirit and the scope of the invention.

What is claimed is:

1. A system for encoding high-definition luminance and chrominance information from a high-definition video source for transmission on a transmission media and said high-definition chrominance information having low-frequency and high-frequency chrominance components, said system comprises:
    means for modulating said high-definition luminance information at a transmission carrier frequency:
    means for band splitting said high-definition chrominance information into said low-frequency and high-frequency chrominance components;
    means for quadrature amplitude modulating said low-frequency chrominance components at a subcarrier frequency;
    means for modulating the quadrature amplitude modulated low-frequency chrominance components at said transmission carrier frequency;
    means for filtering the carrier frequency modulated quadrature amplitude modulated low-frequency chrominance components to remove the lower sideband resulting from the carrier frequency modulation;
    means for quadrature amplitude modulating said high-frequency chrominance components at said subcarrier frequency;
    means for modulating the quadrature amplitude modulated high-frequency chrominance components at said transmission carrier frequency;
    means for filtering the carrier frequency modulated quadrature amplitude modulated high-frequency chrominance components to remove the upper sideband resulting from the carrier frequency modulated; and
    means for combining the carrier frequency modulated high-definition luminance information and the filtered carrier frequency modulated low-frequency chrominance components and the filtered carrier frequency modulated high-frequency chrominance components for transmission on said transmission media.

2. A system for decoding high-definition display information from a received high-definition video signal having carrier modulated high-definition luminance and carrier modulated low-frequency and high-frequency chrominance information having low-frequency and high-frequency chrominance components, said system comprises:
    means for demodulating said modulated luminance information in response to the latter and a signal at the carrier frequency for display purposes; and
    means for notch filtering said video signal to remove said modulated luminance information from between said high-frequency chrominance components;
    means for demodulating the filtered video signal to insert said low-frequency chrominance components into the notch portion of said filtered video signal;
    means for QAM demodulating the demodulated filtered video signal with a subcarrier frequency signal to recover said low- and high-frequency chrominance components for display purposes.

3. A system for encoding high-definition luminance and chrominance information from a high-definition video source for transmission on a transmission media and said high-definition chrominance information having low-frequency and high-frequency chrominance components, said system comprises:

means for modulating said high-definition luminance information at a transmission carrier frequency;

means for band splitting said high-definition chrominance information into said low-frequency and high-frequency chrominance components;

means for quadrature amplitude modulating said low-frequency chrominance components;

means for modulating the quadrature amplitude modulated low-frequency chrominance components at said transmission carrier frequency;

means for filtering the carrier frequency modulated quadrature amplitude modulated low-frequency chrominance components to remove the lower sideband resulting from the carrier frequency modulation;

means for quadrature amplitude modulating said high-frequency chrominance components;

means for modulating the quadrature amplitude modulated high-frequency chrominance components at said transmission carrier frequency;

means for filtering the carrier frequency modulation quadrature amplitude modulated high-frequency chrominance components to remove the upper sideband resulting from the carrier frequency modulation; and means for combining the carrier frequency modulated high-definition luminance information and the filtered carrier frequency modulation low-frequency chrominance component and high-frequency chrominance component for transmission on said transmission media.

4. The system of claim 3 further comprises means for comb filtering said high-definition luminance information received from said video source before modulation by said luminance modulating means; and means for comb filtering said high-definition chrominance information received from said video source before the latter is band split into said high- and low-frequency chrominance components.

5. The system of claim 4 wherein said luminance modulating means comprises means for vestigially sideband filtering said carrier frequency modulated luminance information before transmission.

6. A system for decoding high-definition luminance and chrominance information from a transmitted signal having carrier modulated high-definition luminance information and carrier modulated quadrature amplitude modulated high-frequency chrominance information and quadrature amplitude modulated low-frequency chrominance information, said system comprises:

means for demodulating said modulated luminance information in response to said transmitted signal and a carrier frequency signal;

means for low pass filtering said demodulated luminance information;

means for comb filtering said bandpass limited luminance information for display purposes;

means responsive to said carrier modulated quadrature amplitude modulated high-frequency and low-frequency chrominance information for notch filtering the latter information;

means for demodulating said notch filtered high-frequency and low-frequency chrominance information;

means for bandpass filtering said demodulated high-frequency and low-frequency chrominance information; and means for quadrature amplitude demodulating said band limited high-frequency and low-frequency chrominance information for display purposes.

7. The system of claim 6 wherein said luminance demodulating means further comprises means for vestigial sideband shaping said carrier modulated high-definition luminance information upon receiving the latter information.

8. The system of claim 7 further comprises means for recovering the carrier frequency from said transmitted signal; and said quadrature amplitude modulated demodulating means further comprises means for comb filtering the demodulated high-frequency and low-frequency chrominance information.

9. A system for encoding high-definition luminance and chrominance information from a high-definition video source for transmission on a transmission media and said video source having first and second chrominance components and said second chrominance component having high- and low-frequency segments, said system comprises:

means for band limiting said high-definition luminance information;

means for band limiting the high-frequency segment of said second chrominance component;

means for single sideband modulating said band limited high-frequency segment of said second chrominance component;

means for summing said single sideband modulated high-frequency segment of said second chrominance component and said low-pass limited luminance information;

means for double sideband modulating the summed information;

means responsive to said first chrominance component and said low-frequency segment of said second chrominance component for modulating the latter component and segment;

means responsive to the modulated first chrominance component and low-frequency segment of said second chrominance component for frequency translating the latter; and means responsive to the frequency translated chrominance component and low-frequency segment of said second chrominance component and the summed information for combining the latter for transmission on said transmission media.

10. The system of claim 9 further comprising means for comb filtering said low-frequency and high-frequency segments of said second chrominance component upon reception from said video source.

11. The system of claim 10 wherein said double sideband modulating means comprises means for vestigially sideband filtering said double sideband modulated information.

12. A system for decoding high-definition luminance and chrominance information from a transmitted signal and said high-definition chrominance information comprising a first and second chrominance component and said second chrominance component comprises low- and high-frequency segments, said transmitted signal having carrier modulated high-definition luminance information with said high-frequency segment of said second chrominance component, and said low-frequency segment of said second chrominance component and said first chrominance component modulated and frequency translated to the carrier frequency, said system comprises:

means for detecting said carrier modulated high-definition luminance information with said high-frequency segment;

means responsive to said detected information for comb filtering the latter to obtain said high-definition luminance information for display purposes;

means responsive to said detected information for single sideband demodulating said information to obtain said high-frequency segment of said second chrominance component;

means for demodulating said first chrominance component for display purposes from said transmitted signal;

means for demodulating said low-frequency segment of said second chrominance component; and     means responsive to the demodulated low-frequency segment of said second chrominance component and the demodulated high-frequency segment of said second chrominance component for summing the latter for display purposes.

13. The system of claim 12 further comprises means for comb filtering said first chrominance component for display purposes; and     said summing means comprises means for comb filtering the summed information for display purposes.

* * * * *